United States Patent
Morgan

(10) Patent No.: US 7,613,696 B2
(45) Date of Patent: Nov. 3, 2009

(54) CONFIGURING SEARCH RESULTS USING A LAYOUT EDITOR

(75) Inventor: Brian Stephen Morgan, Londonderry, NH (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 11/361,129

(22) Filed: Feb. 24, 2006

(65) Prior Publication Data

US 2007/0203889 A1  Aug. 30, 2007

(51) Int. Cl.
G06F 7/00 (2006.01)

(52) U.S. Cl. .................. 707/6; 707/2; 707/3; 707/5

(58) Field of Classification Search .............. 707/2, 707/5
See application file for complete search history.

(56) References Cited

U.S. PATENT DOCUMENTS

| | | | | |
|---|---|---|---|---|
| 5,353,401 | A | 10/1994 | Iizawa et al. | 715/763 |
| 5,566,330 | A | 10/1996 | Sheffield | 707/4 |
| 6,038,567 | A | 3/2000 | Young | 707/103 R |
| 6,041,331 | A * | 3/2000 | Weiner et al. | 707/103 R |
| 6,353,448 | B1 * | 3/2002 | Scarborough et al. | 715/744 |
| 6,424,979 | B1 * | 7/2002 | Livingston et al. | 715/206 |
| 6,493,704 | B1 | 12/2002 | Hichwa et al. | 707/3 |
| 6,615,267 | B1 * | 9/2003 | Whalen et al. | 709/229 |
| 6,766,362 | B1 | 7/2004 | Miyasaka et al. | 715/205 |
| 7,251,778 | B1 | 7/2007 | Hill et al. | 715/210 |
| 7,415,537 | B1 * | 8/2008 | Maes | 709/246 |
| 2002/0035595 | A1 * | 3/2002 | Yen et al. | 709/203 |
| 2002/0152279 | A1 | 10/2002 | Sollenberger et al. | 709/217 |
| 2002/0194388 | A1 * | 12/2002 | Boloker et al. | 709/310 |
| 2004/0123238 | A1 | 6/2004 | Hefetz et al. | 715/513 |
| 2004/0166832 | A1 * | 8/2004 | Portman et al. | 455/412.1 |
| 2004/0215608 | A1 * | 10/2004 | Gourlay | 707/3 |
| 2005/0134578 | A1 | 6/2005 | Chambers et al. | 345/184 |
| 2005/0235223 | A1 | 10/2005 | Arend et al. | 715/792 |
| 2006/0035629 | A1 * | 2/2006 | Kodama et al. | 455/415 |
| 2006/0236231 | A1 | 10/2006 | Allen et al. | 715/517 |
| 2007/0124661 | A1 | 5/2007 | Hackworth et al. | 715/500 |

OTHER PUBLICATIONS

Office action from pending U.S. Appl. No. 11/361,106, mailed Aug. 5, 2009, 30 pages.

* cited by examiner

*Primary Examiner*—Apu M Mofiz
*Assistant Examiner*—Thu Nga Nguyen
(74) *Attorney, Agent, or Firm*—VanLeeuwen & VanLeeuwen; Erin C. Ming

(57) ABSTRACT

A request is received from a requestor over a computer network and compared to a plurality of triggers associated with a plurality of layout configurations. One of the layout configurations is then selected based on the comparison. Next, components are identified for the selected layout configuration. A markup language response (e.g., HTML) is created that includes a markup language version of each of the identified components. The markup language version for at least one of the identified components is based upon a query answer that corresponds to the request. The markup language response is returned to the requestor over the computer network where it can be viewed using a browser running on the requestor's computer.

12 Claims, 15 Drawing Sheets

CONFIGURING SEARCH RESULTS USING A LAYOUT EDITOR

BACKGROUND OF THE INVENTION

1. Technical Field

The present invention relates in general to a system and method for configuring search results. More particularly, the present invention relates to a system and method that configures search results based upon a layout configuration using matching triggers.

2. Description of the Related Art

Today, many organizations use web sites installed on servers to communicate with a wide variety of people. This wide variety of people include the organization's employees, customers, and business partners. Employees, customers, and business partners access the organization's web site using a computer network, such as a local area network (LAN), wide area network (WAN), or a large, publicly accessible computer network, such as the Internet. In building these web sites, organizations use search solutions that are developed and provided by technology providers. These search solutions are designed to address the various requests that the web site is anticipated to receive.

A challenge that currently exists with traditional search solutions is the integration of the search solution with the organization's existing web site. One approach to this challenge is to modify, or tailor, the search solution so that it meets the specific needs of the organization's end users (i.e., the customers, employees, and business partners who access the web site). A challenge to this approach is that it can be quite complex to tailor the search solution. Another challenge to this approach is that technically experienced individuals are needed to hand code configuration code. One way that this is accomplished is by having programmers or other technically experienced individuals hand code Java Server Pages (JSP) or Active Server Pages (ASP) that will configure the search results to conform to the organization's needs. One challenge of this approach is that the JSP or ASP code requires technically experienced individuals that are often in short supply and highly compensated. Another challenge of this approach is that a relatively long period of time may be needed to develop the JSP or ASP code. Finally, another challenge of this approach is that once the JSP or ASP code is written, the experienced individuals will be needed to maintain and modify the code as the organization's web site evolves.

What is needed, therefore, is a system and method that provides configuration of search results without the need to write conversion code. More specifically, what is needed is a system and method that selects a configuration layout based upon the search results and automatically generates a markup language version that includes both the results and the selected configuration layout.

SUMMARY

It has been discovered that the aforementioned challenges are resolved using a system, method, and program product that receives a request from a requestor over a computer network and compares the request to a plurality of triggers associated with a plurality of layout configurations. One of the layout configurations is then selected based on the comparison. Next, components are identified for the selected layout configuration. A markup language response (e.g., HTML) is created that includes a markup language version of each of the identified components. The markup language version for at least one of the identified components is based upon a query answer that corresponds to the query. The markup language response is returned to the requestor over the computer network where it can be viewed using a browser running on the requestor's computer.

In one embodiment, the request is a query request, the system, method, and program product answer the query request, the answer resulting in query results, and the query results are included in the markup language response.

In one embodiment, the system, method, and program product, answer the query request using a search engine, and the markup language response returned to the user is in a Hypertext Markup Language format.

In one embodiment, the system, method, and program product identify a rule that corresponds to one of the identified components. Features are then retrieved that correspond to the identified rule. The markup language response then includes markup language versions of the retrieved features.

In one embodiment, the system, method, and program product retrieves user data corresponding to the requestor. The user data is used to augment the request. The layout configuration that is selected is based in part on the user data.

In one embodiment, the system, method, and program product receives site context data from the received request. The request is augmented with the received site context data prior to performing the comparing. The selected layout configuration is based in part on the received site context data.

In one embodiment, the system, method, and program product identifies layout locations within the selected layout configuration, with each of the layout locations including one or more of the identified components. Rules corresponding to each of the identified components are then identified. Next, layout features used to satisfy the identified rules are retrieved. A result object that includes the selected layout configuration and the retrieved layout features is updated to include the layout features. The markup language response is then created from the result object.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
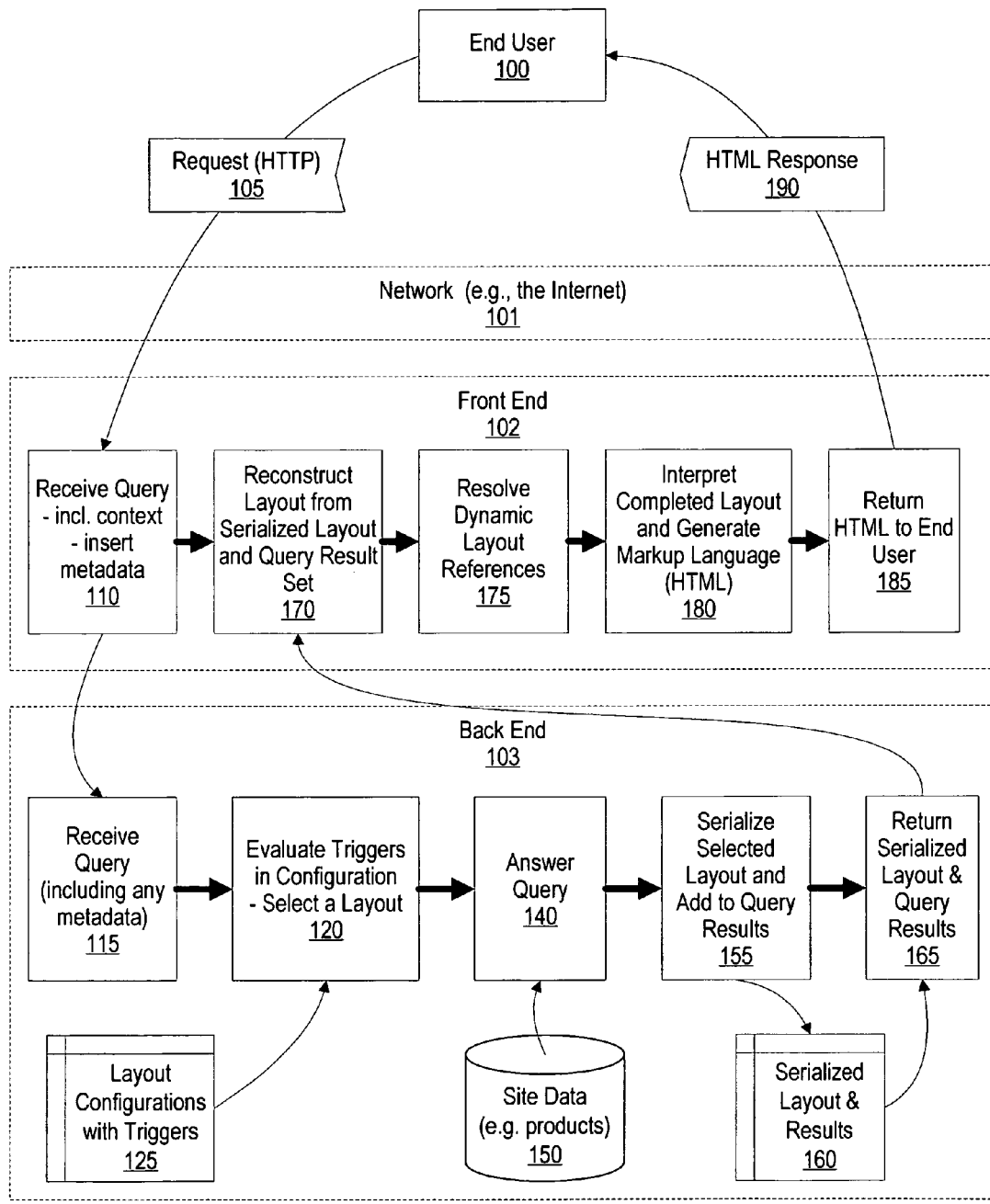
FIG. 1 is a system diagram showing the interaction between the end user, the front end, and the back end, in processing the end user's request.

FIG. 1 is a system diagram showing the interaction between the end user, the front end, and the back end, in processing the end user's request. End user 100 uses an information handling device, such as a personal computer (PC), a handheld computing device, such as a personal digital assistant (PDA), or any number of information handling devices that is capable of connecting to network 101. Network 101 may be any kind of network capable of interconnecting devices that transmit data from one device to another over the network. Examples of network 101 include a local area network (LAN), a wide area network (WAN), a public switched telephone network (PSTN), and a global packet-based network, such as the Internet.

End user 100 sends request 105 to a server. In one embodiment, the request is encoded using the Hypertext Transfer Protocol (HTTP) which is a protocol setting forth rules for exchanging files on the World Wide Web (www). The request is received by front end 102. Front end 102 and back end 103 may be located on a common server or may be on different servers interconnected through network 101 or using a different network separate and apart from network 101.

At step 110, the front end receives the query request from the end user (request 105). The request that is received may include context information that identifies the context of the end user's session with the web site that is supported by front end 102 and back end 103. In one embodiment, step 110 includes augmenting the user's request with additional metadata corresponding to a profile that corresponds to the end user and/or the site context. Augmenting the request with user profile and/or site context data is optional. This metadata can be useful to the layout architecture because it can allow for additional decisions to be made when determining which layout configuration to use as well as when determining which components for the layout to use. In one embodiment, the (augmented) query request is serialized and formed into a Simple Object Access Protocol (SOAP) request. SOAP is a protocol for exchanging XML-based messages over a computer network, normally using HTTP (HyperText Transfer Protocol). It will be appreciated by those skilled in the art that other protocols could be used instead of SOAP, however the implementation described herein utilizes the SOAP protocol.

SOAP forms the foundation layer of the web services stack, providing a basic messaging framework that more abstract layers can build on. SOAP facilitates the Service-Oriented architectural pattern. There are several different types of messaging patterns in SOAP. A common type of message pattern in SOAP is the Remote Procedure Call (RPC) pattern, where one network node (in this case, front end 102) sends a request message to another node (in this case, back end 103), and the server (back end 103) sends a response message to the client (the front end).

At step 115, back end 103 receives the query request from the front end. The query includes any context and metadata included in the query by the front end. At step 120, the back end compares triggers that correspond to layout configurations stored in memory 125 with the query request in order to select one of the layout configurations. At step 140, the back end answers the query that was received at step 115 by retrieving site data 150. For example, if the end user was requesting information on "IBM monitors", then the query answer would retrieve such information from site data 150. Site data 150 is commonly stored using a database management system. (DBMS), such as a relational database, and the query is often formed using a Structured Query Language (SQL), such as "SELECT * FROM PRODUCTS WHERE 'MANUF=IBM' AND 'ITEMTYPE=MONITOR'". Various types of searches, such as text based, could be used in addition to the column-based search constraints referenced here.

At step 155, the selected layout is serialized to a compact XML format and added to the query results retrieved from site data 150. The serialized layout and results are stored in memory 160. At step 165, the serialized layout and query results are returned to front end 102. In one embodiment, the serialized layout and results are returned in a SOAP response that corresponds to a SOAP request that was initially sent from the front end to the back end.

Returning to front end processing, at step 170, the response that includes a selected layout and the query results is received from the back end. The layout is reconstructed from the serialized layout and query result set included in the response (i.e., included in a received SOAP response). Some of the layout references can be dynamic references. At step 175, these dynamic references are resolved. For example, non-placed values from the result set can be placed in the layout where there are refinement and result set fill references. Instead of referencing a refinement or resultset directly a reference to "*" or "fill" can be made. From the result object on the front end the complete set of refinements and resultsets are collected. Then all explicit references to refinements and resultsets are collected in the layout and removed from the complete set acquired from the result object above. Processing then walks through the layout and finds all "fill" references. When found, the refinement or resultset configuration in the layout is replicated and replaced for each element not already placed in the layout. At step 180, the completed layout (including the resolved dynamic references) are interpreted in order to create a markup language version (i.e., an HTML document version). At step 185, the markup language version (HTML Response 190) is returned to the end user over network 101.

End user 100 receives the markup language version (HTML Response 190) from the front end. The markup language version is in a format suitable to be interpreted and rendered using browser software running on the end user's information handling device. The browser software then renders the markup language (i.e., HTML) so that it is visible to end user 100 on a display panel. The end user can then make selections (queries) based on the newly displayed information which will cause a new request (Request 105) to be sent to front end 102 (with new query and context information) that will be processed as described above with the result being a new markup language response (HTML Response 190) that will be returned to the end user and rendered using the browser software in the end user's information handling system. This continues until the end user ends the session with the web site that is being supported by front end 102 and back end 103.

Figure 2:
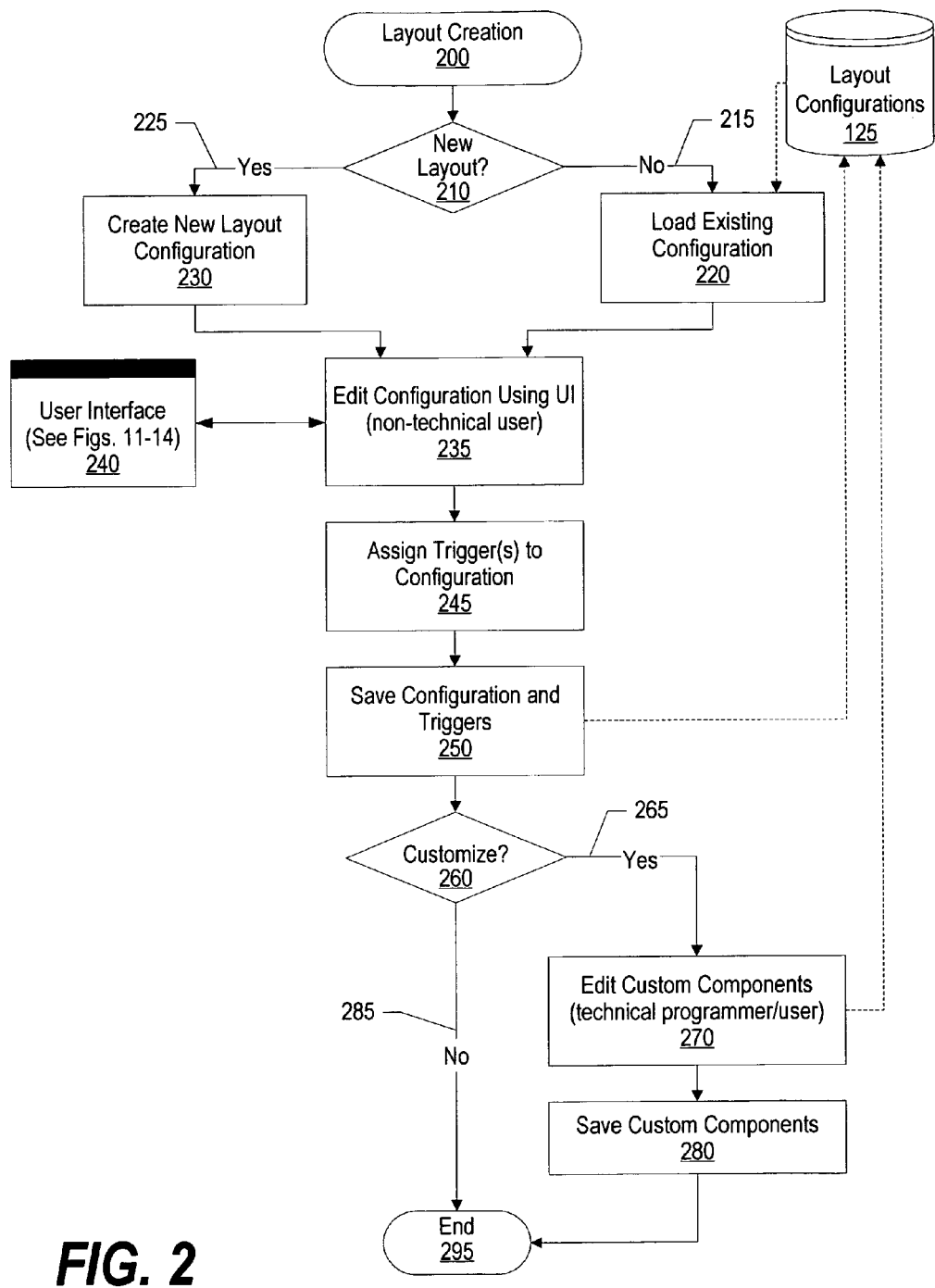
FIG. 2 is a flowchart showing the steps taken to prepare a layout configuration used by the system.

FIG. 2 is a flowchart showing the steps taken to prepare a layout configuration used by the system. Layout creation processing commences at 200 whereupon a determination is made as to whether the user is creating a new layout or editing an existing layout (decision 210). If the user is editing an existing layout, decision 210 branches to "no" branch 215 whereupon, at step 220, an existing layout configuration is loaded by retrieving one of the layout configurations stored in layout configurations data store 125. Stored layout configurations 125 includes triggers that correspond to query data. Data store 125 can be stored in a memory (as shown in FIG. 1) or in a nonvolatile storage device, such as a hard drive or other form of nonvolatile memory. Returning to decision 210, if the user is creating a new layout, decision 210 branches to "yes" branch 225 whereupon a new layout configuration is created at step 230.

At step 235, the user edits the layout configuration (either the new layout configuration or the existing layout configuration) using user interfaces 240 (see FIGS. 11 through 14 for details regarding the graphical user interfaces). At step 245, the end user assigns triggers to the layout configuration. An example of a trigger is "e:0//state//:eq//init." This trigger is saying that this layout should be selected if the "state" attribute is equals to "init". Triggers that check to see if a constraint has been set can also be used. For example, if a particular manufacturer brand has been selected by the user, then a model refinement layout could be selected. Such a trigger could be either "x:0//brand" or "y:0//brand." An additional Graphical User Interface (GUI) screen could be provided to alleviate the user entering text-based triggers and allow the user to select trigger components from the GUI. At step 250, the layout configuration and the triggers assigned to the layout configuration are saved in layout configurations data store 125.

A determination is made as to whether to customize the layout configuration that was created using the GUI layout editor (decision 260). If the layout configuration should be customized, decision 260 branches to "yes" branch 265 whereupon, at step 270, custom components corresponding to the layout configuration are edited and, at step 280, the edited custom components are saved in layout configurations data store 125 and processing ends at 295. A layout can be configured using the user interface (UI) shown in FIGS. 11-14. If there is something that cannot be done through the UI, then a custom component is added in the configuration. The layout configuration is tied to custom code (written by a more technical person). Returning to decision 260, if the layout configuration does not need to be customized, decision 260 branches to "no" branch 285 bypassing steps 270 and 280 and processing ends at 295.

Figure 3:
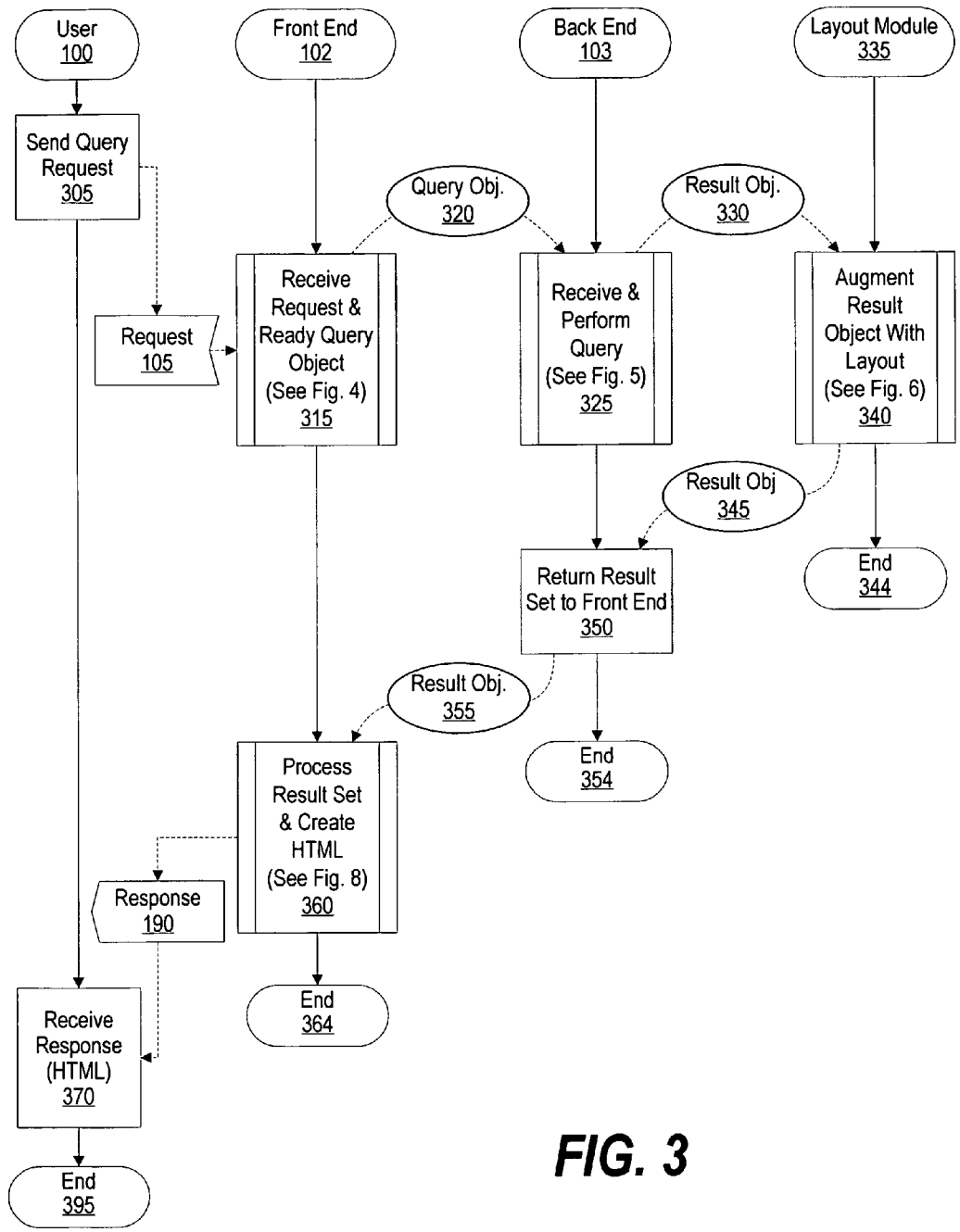
FIG. 3 is a flowchart showing the high level steps taken by end user and various servers in processing the end user's request.

FIG. 3 is a flowchart showing the high level steps taken by end user and various servers in processing the end user's request. At step 305, end user 100 sends a query request to the web site (request 105). In one embodiment the request is in an HTTP format. The request is received by the web site's front end 102. At predefined process 315, the front end receives the request and readies a query object (see FIG. 4 and corresponding text for processing details).

Query object 320 is sent from front end 102 to back end 103 for processing. In one embodiment, SOAP is used to form the request that is sent from the front end to the back end. Back end 103 receives the request (query object 320) and answers the query at predefined process 325 (see FIG. 5 and corresponding text for processing details). For example, the back end could run a query using the query object against a relational database. In addition, a search engine could be used by the back end to gather data, such as product data, stored in a data store, such as a database. The results of the query are included in result object 330 and sent to a layout module for further processing.

Figure 6:
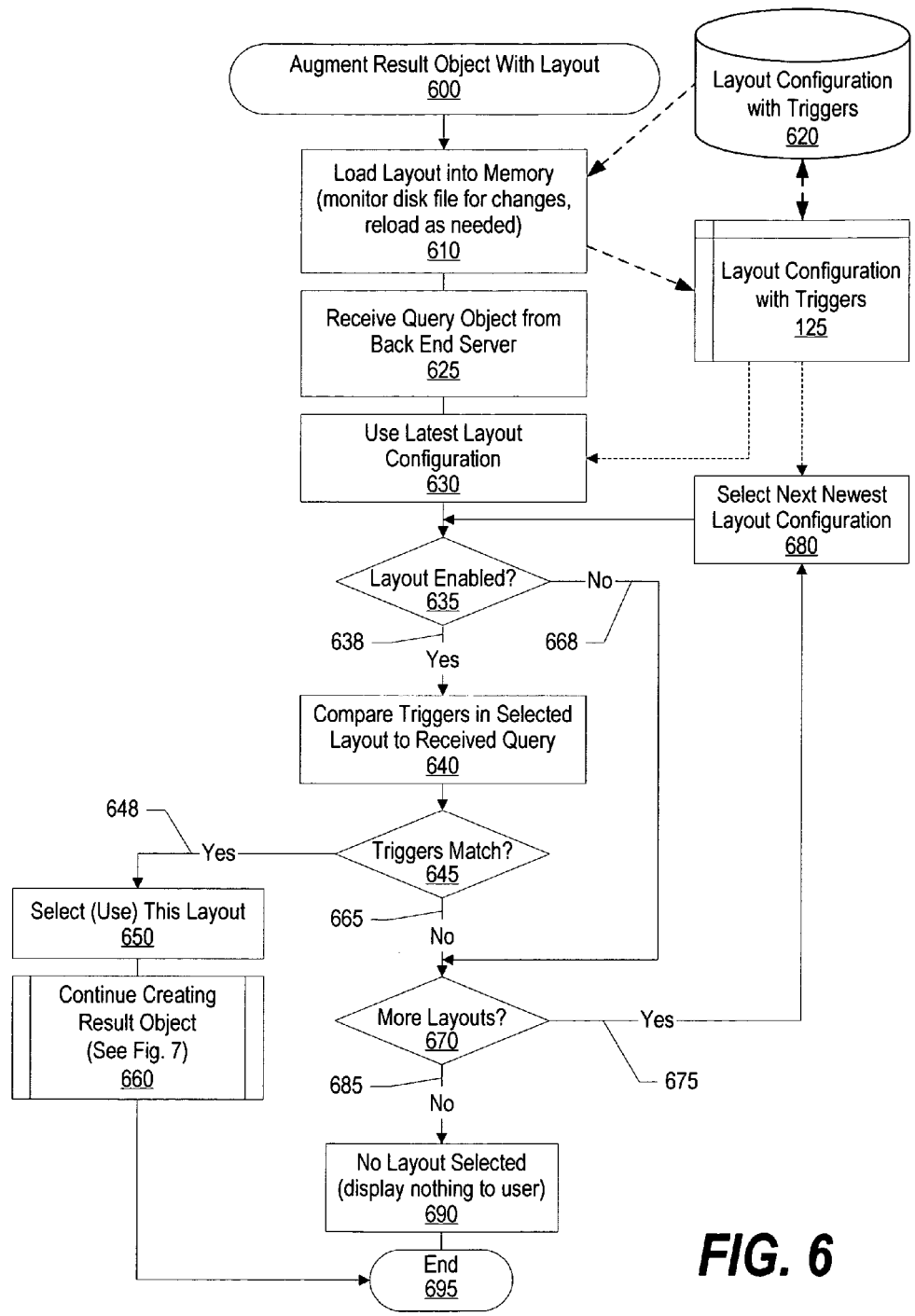
FIG. 6 is a flowchart showing the steps taken to augment a result object with a layout.

Layout module 335 receives result object 330, selects a layout, and augments the query result with the layout configuration (predefined process 340, see FIG. 6 and corresponding text for processing details). In one embodiment, layout module 335 is a process running on the back end server. In another embodiment, the layout module is running on a separate server. A protocol, such as SOAP, may be used to send the result object from the back end server to the layout module and to receive the modified result object (result object 345) that includes the layout configuration. In an alternate embodiment, the layout module runs as a process on the back end server. Layout module processing ends at 344.

At step 350, the back end receives the result object from the layout module that has been augmented with a layout configuration and returns the augmented result object back to the front end and back end processing ends at 354.

At predefined process 360, the front end receives the result object from the back end. The result object includes the layout configuration. The front end processes the result set (layout configuration and query results) and creates a markup language file (e.g., HTML file) that is returned to the end user (see FIG. 8 and corresponding text for processing details of predefined process 360). Response 190 is sent from front end 102 to end user 100 and front end processing ends at 364.

End user 100 receives response 190 from the front end at step 370. The response is encoded in a markup language, such as HTML. Browser software running on the end user's information handling system is used to interpret the markup language and render a display panel on the user's display. End user processing ends at 395. The end user can make selections/queries using the panel displayed on the browser. These selections and/or queries will result in another request (request 105) being sent to the front end for processing as described above. This continues until the end user stops communicating with the web site that is being supported by front end 102 and back end 103.

Figure 4:
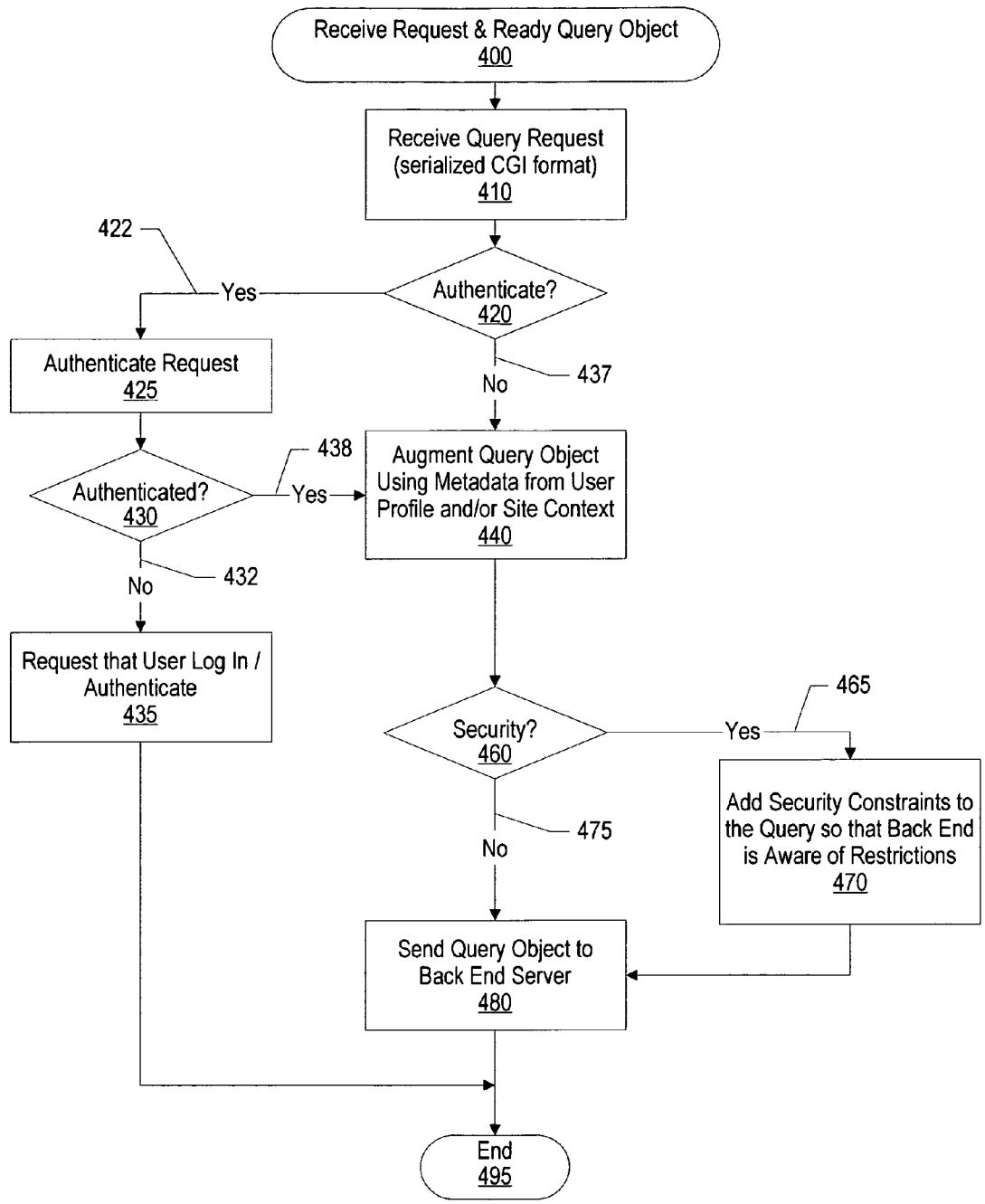
FIG. 4 is a flowchart showing the steps taken to receive the end user's request and ready a query object.

FIG. 4 is a flowchart showing the steps taken to receive the end user's request and ready a query object. Processing commences at 400 whereupon, at step 410, a query request is received. In one embodiment, the request is in a serialized Common Gateway Interface (CGI) format. CGI is a format that allows HTML pages to interact with programming applications.

The system provides for optional authentication. For example, in some systems users "log in" to the system (i.e., using a user identifier and password) in order to identify themselves to the system. Authenticating the user can facilitate providing customized views depending on the users' identities. A determination is made as to whether authentication is being used (decision 420). If authentication is being used, decision 420 branches to "yes" branch 422 whereupon, at step 425, the request is authenticated. A determination is made as to whether the request was successfully authenticated (decision 430). If the request was not successfully authenticated, decision 430 branches to "no" branch 432 whereupon, at step 435, a request is returned to the end user asking that the user log in or otherwise authenticate the request and processing ends at 495. On the other hand, if either authentication is not being used (decision 420 branching to "no" branch 437) or the user was successfully authenticated (decision 430 branching to "yes" branch 438), then processing of the request continues.

At step 440, the query object is augmented using metadata from a user profile (in the case of an authenticated end user) and/or using metadata from site context information that was included in the user's request. Optional additional security constraints can be customized and included. For example, a security constraint could limit the information returned to a particular end user, such as an employee. A determination is made as to whether additional security constraints have been included (decision 460). If additional security constraints are included, decision 460 branches to "yes" branch 465 whereupon, at step 470, the security constraints are added to the query object so that such constraints will be provided to the back end when the back end answers the query. On the other hand, if additional security constraints have not been included, decision 460 branches to "no" branch 475 bypassing step 470.

The query object (augmented to include any metadata regarding the end user, site context, and security constraints) is sent to the back end for processing at step 480. Processing thereafter ends at 495.

Figure 5:
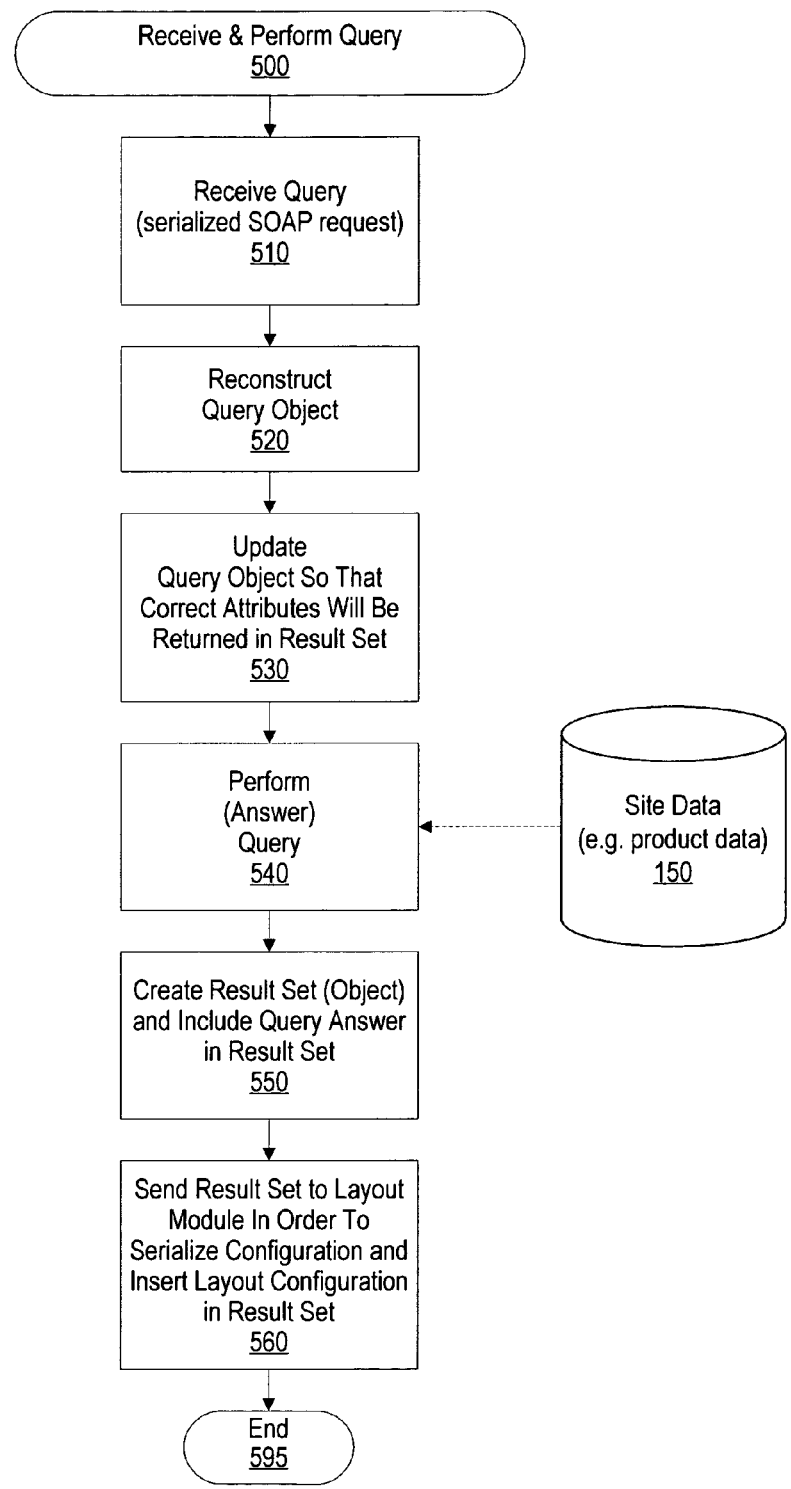
FIG. 5 is a flowchart showing the steps taken to receive and perform (answer) the query.

FIG. 5 is a flowchart showing the steps taken to receive and perform (answer) the query by the back end. At step 510, the back end receives the augmented query request from the front end. In one embodiment, the query request that is received is a serialized SOAP request. At step 520, the back end reconstructs the query object from the received query object (i.e., reconstructs the query from the serialized SOAP request). At step 530, the query object is updated so that correct attributes will be returned in the result set. By default the search engine returns no columns (attributes) for a particular result in a resultset table. The layout configuration has all the information about what attributes should be shown for a particular result row. At this point in the processing the query object is updated to reflect the attributes defined in the layout, making sure that these columns are present in the result tables returned, so that the front-end can have the correct values when generating HTML. At step 540, the query is performed (answered) by running it against a data store, such as site data 150. For example, if the end user was requesting information on "IBM monitors", then the query answer would retrieve such information from site data 150. Site data 150 is commonly stored using a database management system (DBMS), such as a relational database, and the query is often formed using a Structured Query Language (SQL), such as "SELECT * FROM PRODUCTS WHERE 'MANUF=IBM' AND 'ITEMTYPE=MONITOR'". In addition, a search engine can be used to perform the query using data stored in a data store, such as a database. The results of the query (the "query answer," e.g., the IBM monitors available from the web site) are used in step 550 to create a result set object. At step 560, the result set object are sent to the layout module in order to identify a layout configuration, serialize the layout configuration, and insert the serialized layout configuration in the result set. Processing thereafter ends at 595.

FIG. 6 is a flowchart showing the steps taken to augment a result object with a layout. Processing commences at 600 whereupon, at step 610, the complete layout configuration, which can be made up of multiple individual layout configurations, is loaded from nonvolatile storage 620 to memory 125. The file in nonvolatile storage (620) is monitored for changes. When changes are made to any individual layout(s) using the layout configuration GUI (see FIGS. 11-14), the changes are detected and the back end reloads the memory version (125) using the version saved to nonvolatile storage. This allows new or changed layout configurations to be provided to the end users without having to restart any of the servers.

At step 625, the layout module receives the augmented query object from the back end server. Starting at step 630, the individual layout configurations included in memory 125 are analyzed in order to select a layout configuration. In one embodiment, the last layout configuration is analyzed first (step 630) and processing continues to analyze the "next newest" layout configurations until one is eventually found. The layouts are really not "age" based and the user of the GUI can change the order in which layouts are processed.

A determination is made as to whether the current selected layout has been enabled (decision 635). In creating and editing layout configurations, the user can indicate whether the layout configuration is currently enabled (see FIGS. 11-14). If the currently selected layout configuration is enabled, decision 635 branches to "yes" branch 638 whereupon, at step 640, triggers corresponding to the currently selected layout configuration are compared with the received query. A determination is made as to whether the triggers match the query (decision 645). If the triggers match, decision 645 branches to "yes" branch 648 whereupon the currently selected layout configuration is selected for use as the layout to return to the end user (step 650) and processing continues creating the result object (predefined process 660, see FIG. 7 and corresponding text for processing details), and processing ends at 695.

On the other hand, if either the currently selected layout configuration is not enabled (decision 635 branching to "no" branch 668) or the triggers in the currently selected layout configuration do not match the received query (decision 645 branching to "no" branch 665), then a determination is made as to whether there are more layout configurations to analyze in order to find a matching layout configuration (decision 670). If there are more layout configurations to try, decision 670 branches to "yes" branch 675 whereupon, at step 680, the next newest layout configuration is selected and processing loops back to analyze the newly selected layout configuration to see whether the layout configuration should be used. This continues until either a layout is selected and used (decision 645 branching to "yes" branch 648) or there are no more layout configurations to analyze. If there are no more layout configurations to analyze, decision 670 branches to "no" branch 685 whereupon, at step 690, no layout configuration is selected. In one embodiment, when no layout is selected, nothing is displayed to the end user. In an alternate embodiment, when no layout is selected, a default layout configuration is selected and displayed to the user. Thereafter, processing ends at 695.

Figure 7:
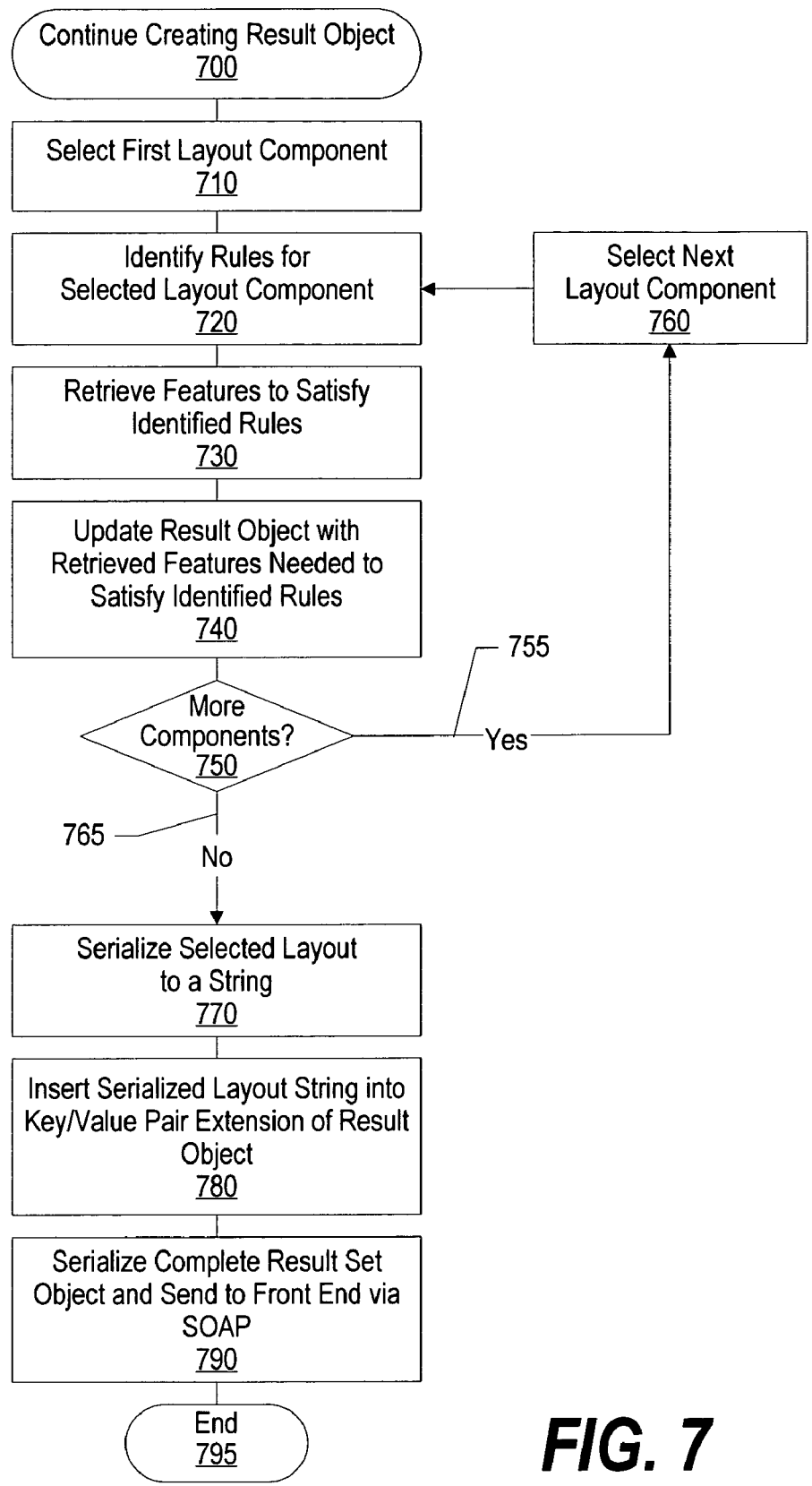
FIG. 7 is a flowchart showing the steps taken to continue creating the result object.

FIG. 7 is a flowchart showing the steps taken to continue creating the result object. In one embodiment, a layout configuration is divided into a number of "locations" that are children of the layout (see FIGS. 11-14). For example, these locations can include the top portion of the layout, the left portion, the center portion, the right portion, and the bottom portion. Each of these locations can have "components" as children. These components can include a bread crumb component, a page control component, a custom component, a query box component, an HTML result set component, a refine group component, a sub-location component, a result set component, and a voice over component. In FIG. 7, the components included in a layout configuration are analyzed.

Processing commences at 700 whereupon, at step 710, the first layout component is selected. At step 720, rules that correspond to the selected component are identified. Rules are elements in the layout configuration. Their main task is to hold a trigger. This allows for conditionally rendering of a component based on the incoming query and query context. Features (as related to the search engine) correspond to entities that are indexed by the engine. Indexed attributes are either columns in a DB or values that are processed for textual searches. At step 730, the features that are used to satisfy the identified rules are retrieved. At step 740, the result object is updated with the retrieved features that are used to satisfy the identified rules for the selected component. A determination is made as to whether there are more components included in the selected layout configuration (decision 750). If there are more components, decision 750 branches to "yes" branch 755 whereupon, at step 760, the next layout component is selected and processing loops back to identify rules for the component and retrieve features to satisfy the component. This looping continues until all components have been processed, at which point decision 750 branches to "no" branch 765.

At step 770, the selected layout configuration is serialized to a string. At step 780, the serialized layout configuration string is inserted into a key/value pair extension of the result object. At step 790, the complete result set is serialized and returned to the front end in a SOAP response format. Processing thereafter ends at 795.

Figure 8:
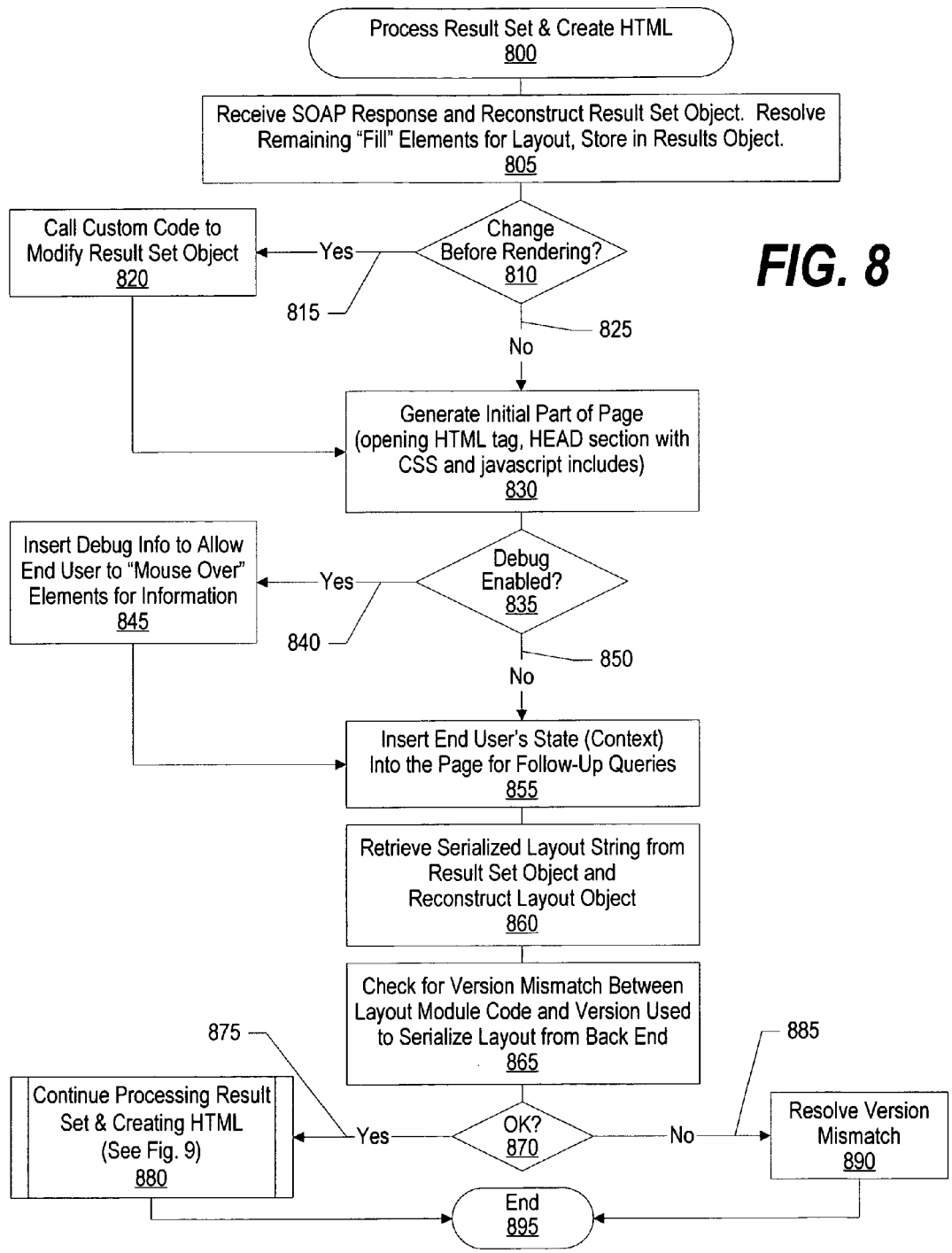
FIG. 8 is a flowchart showing the steps taken to continue processing the result set (object) and create an HTML response for the end user.

FIG. 8 is a flowchart showing the steps taken to continue processing the result set (object) and create an HTML response for the end user. Processing commences at 800 whereupon, at step 805, the front end receives the SOAP response from the back end. The SOAP response includes a selected layout configuration and the answer to the end user's query. The front end reconstructs the result set object by parsing the SOAP object, and the serialized layout is parsed into real objects. The front end resolves any remaining "fill" elements for the selected layout and stores the "fill" elements in the reconstructed results object.

A customization hook allows customized programming to change the results object before the HTML is created that will render the result object using the selected layout configuration. A determination is made as to whether such customized code exists (decision 810). If such customized code exists, decision 810 branches to "yes" branch 815 whereupon, at step 820, the custom code is called in order to modify the result object. On the other hand, if such custom code does not exist, decision 810 branches to "no" branch 825 bypassing step 820.

At step 830, the initial part of the page that will be returned to the end user is generated. The initial part of the page includes the opening HTML tag, the HEAD section along with cascading style sheet (CSS) includes and any javascript includes. Cascading style sheets is a feature of HTML that provides more control as to how web pages are displayed. Using CSS, developers can define how different elements, such as headers and links, appear on the resulting page. Javascript is a scripting language used in web pages and embedded within the HTML page being returned to the end user. Among other things, the HEAD section tag indicates what CSSes and javascripts are included.

A determination is made as to whether debug is enabled (decision 835). If debug is enabled, decision 835 branches to "yes" branch 840 whereupon, at step 845, information is inserted that allows the end user to "mouse over" various elements that appear on the web page in order to view detailed information about the element (i.e., contextual help). On the other hand, if debug is not enabled, decision 835 branches to "no" branch 850 bypassing step 845.

At step 855, the end user's state (context) information is inserted into the HTML page for follow-up queries. When the end user requests another query, this context information is included in the request that is received by the front end.

At step 860, the serialized layout string is retrieved from the result set object and the layout configuration is reconstructed using the serialized layout string. At step 865, a version mismatch check is made by comparing the version of the layout module code and the version used to serialize the layout configuration from the back end. In one embodiment, step 865 is performed because a compact parser is used to send the layout configuration from the back end to the front end. The compact parser relies on information position instead of using additional space to specifically identify attributes included in the serialized string. A determination is made as to whether the version used in the layout module matches the version used to serialize the layout from the back end (decision 870). If the versions match, decision 870 branches to "yes" branch 875 whereupon the front end continues to process the result set and continues creating the HTML response (predefined process 880, see FIG. 9 and corresponding text for processing details), and processing thereafter ends at 895. On the other hand, if the versions do not match, decision 870 branches to "no" branch 885 whereupon, at step 890, the version mismatch is resolved and processing thereafter ends at 895.

Figure 9:
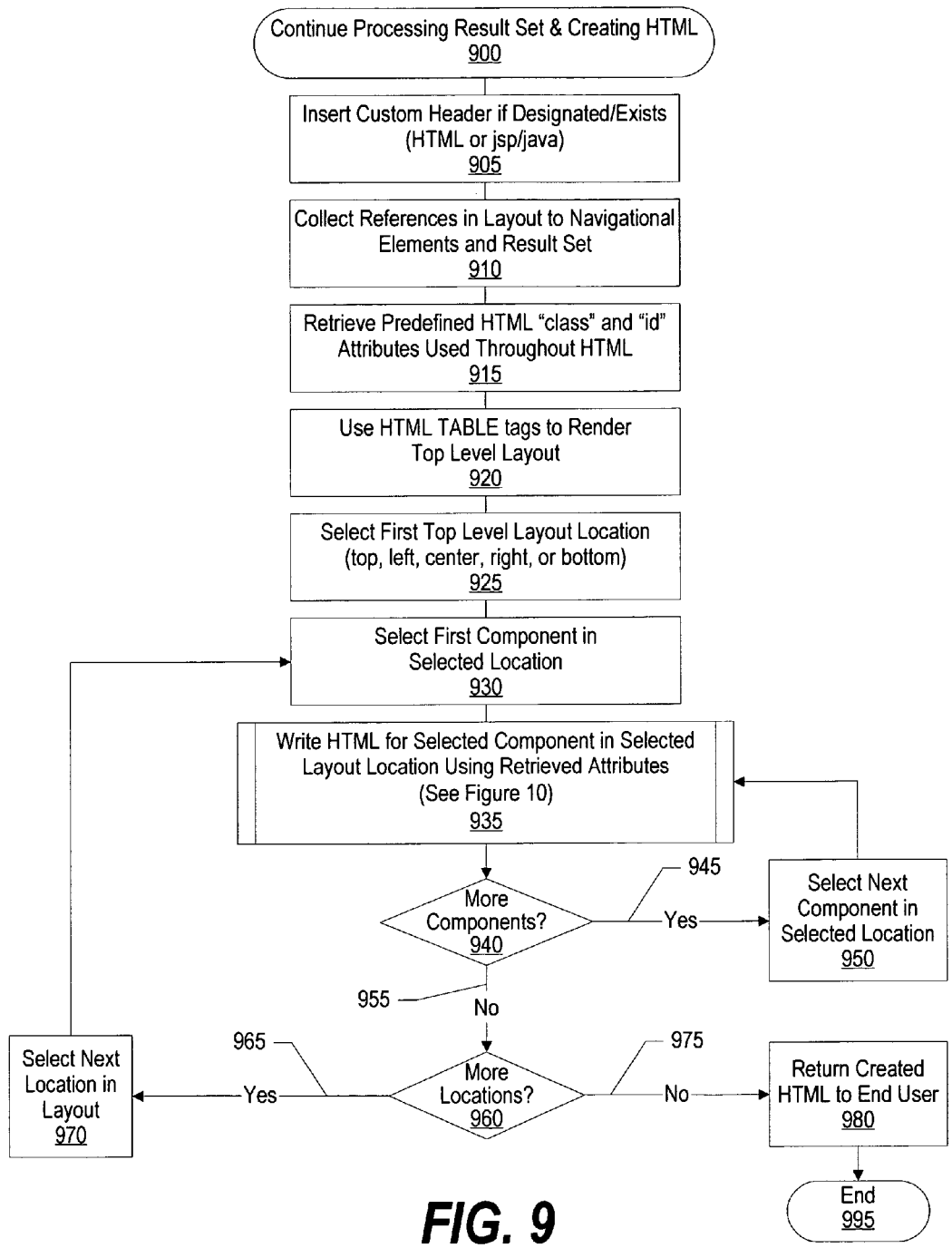
FIG. 9 is a flowchart showing the steps taken to process the result set (object) and finalize the HTML response.

FIG. 9 is a flowchart showing the steps taken to process the result set (object) and finalize the HTML response. Processing commences at 900 whereupon, at step 905, a custom header is inserted if it has been set up. The custom header can be written in HTML, JSP, or Java and will appear at the top of all pages for the web site that are rendered in the end user's browser. At step 910, all explicit references in the layout configuration to navigational elements and result sets are collected. Instead of referencing a refinement or resultset directly a reference to "*" or "fill" can be made. From the result object on the front end the complete set of refinements and resultsets are collected. Then all explicit references to refinements and resultsets are collected in the layout and removed from the complete set acquired from the result object above. Processing then walks through the layout and finds all "fill" references. When found, the refinement or resultset configuration in the layout is replicated and replaced for each element not already placed in the layout. At step 915, predefined HTML "class" and "id" attributes are retrieved. These attributes will be used throughout the HTML file that is generated and returned to the end user. At step 920, HTML TABLE tags are inserted in the HTML file in order to render the top level layout. At step 925, the first top level layout configuration is selected. In one embodiment, the layout is divided into five locations: top, left, center, right, and bottom. When creating the layout configuration (see FIGS. 2 and 11-14), the non-technical developer can decide what components should appear in the various locations. At step 930, the first component that is included in the selected layout location is selected.

Figure 10:
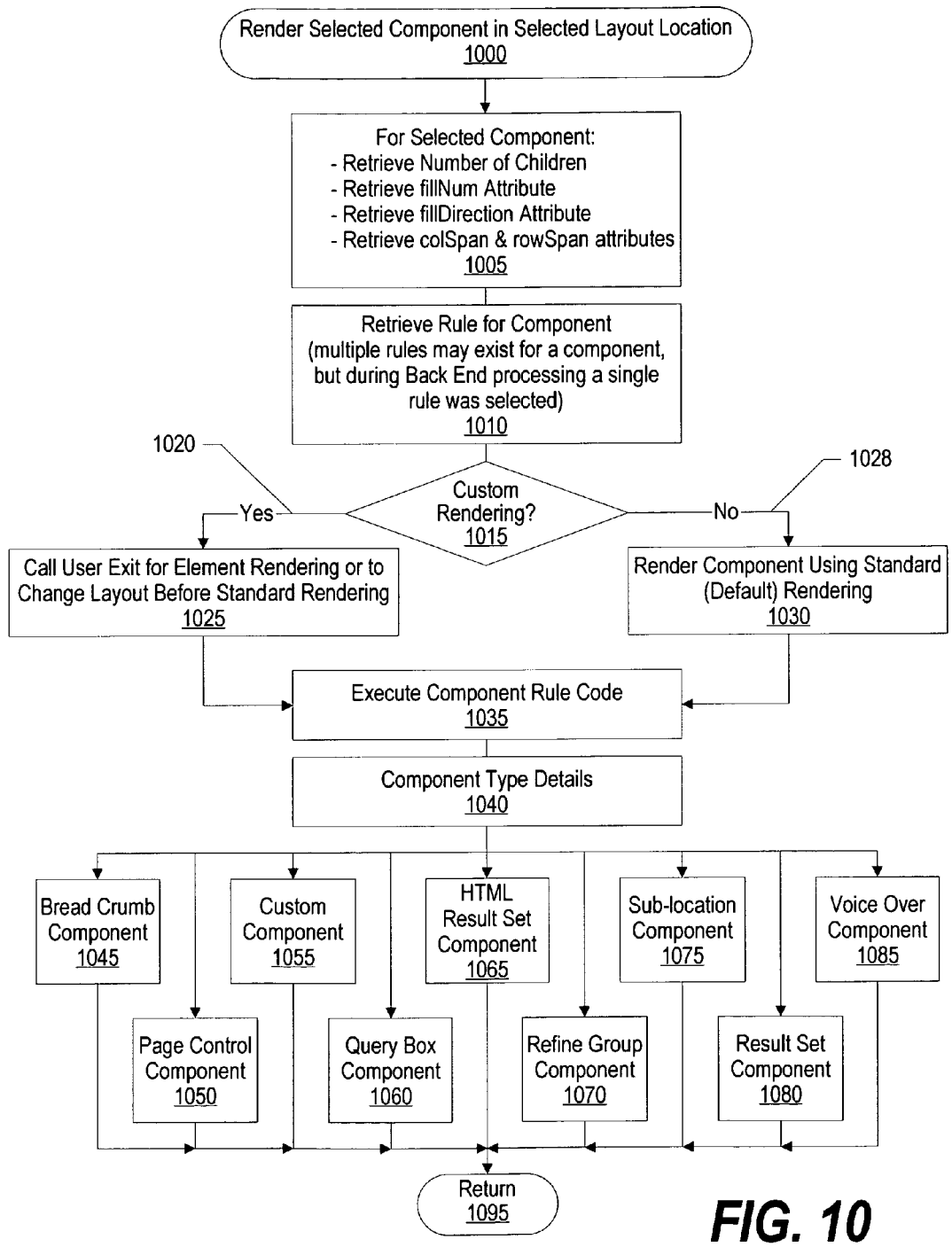
FIG. 10 is a flowchart showing the steps taken to render a component in a particular layout location.

For the selected layout location and the selected component, HTML is written to generate the selected component in the location so that the component will be rendered when the HTML is received and processed by the end user's browser (predefined process 935, see FIG. 10 and corresponding text for processing details). A determination is made as to whether there are more components to be generated (decision 940). If there are more components to be generated for the selected layout location, decision 940 branches to "yes" branch 945 whereupon the next component for the selected layout location is selected (step 950), and processing loops back to generate the HTML for the selected component. This looping continues until HTML for all components for the selected layout location have been generated, at which point decision 940 branches to "no" branch 955.

After all components for a selected layout location have been generated, a determination is made as to whether there are more layout locations to process (decision 960). If there are more locations to process, decision 960 branches to "yes" branch 965 whereupon, at step 970, the next location in the selected layout configuration is selected and processing loops back to select each of the components in the newly selected layout location and write the HTML needed to render each of the components. This looping continues until all locations have been processed, at which point decision 960 branches to "no" branch 975 whereupon, at step 980, the created HTML that includes code for rendering all the components included in all the layout locations is returned to the end user. Processing thereafter ends at 995.

FIG. 10 is a flowchart showing the steps taken to render a component in a particular layout location. Processing commences at 1000 whereupon, at step 1005 attributes corresponding to the selected component are retrieved. These attributes include the number of "children" for the component, the fill number (fillNum) and fill direction for the component, and the column and row span attributes (colSpan and rowSpan). Fill number and direction indicates how a layout location will be filled in a grid. Fill direction indicates whether the layout location will be filled horizontally (i.e., from left to right) or vertically (i.e., from top to bottom). Fill number indicates the length of the stride. For example, if fillNum=4 and fillDirection=horizontal, the location will contain 4 columns per row, but no predetermined number of rows. If fillNum=3 and fillDirection=vertical, then the area will contain 3 rows per column, but no predetermined number of columns. ColSpan and rowSpan are attributes that affect how items are placed using the fillNum and fillDirection attributes. ColSpan and rowSpan allow for each child (item) to take up more than one horizontal or vertical position. For example, if a parent element has a fillNum=3, a fillDirection=horizontal, and a child with a colSpan attribute of 3, the child element would take up an entire row because the colSpan declaration states that the child element takes up 3 spaces (the same as the fillNum value).

At step 1010, a rule that corresponds to the component is retrieved. The rule is part of the configuration hierarchy. Each component can have multiple child rules. The backend evaluates the trigger attached to each rule to determine which rule will be selected. The back end selects one rule per component. Every component has a rule as a child. This is what allows for dynamic changes within a selected layout. Each component has a few attributes (e.g., rowSpan and colSpan) and is used as a container for rules. In one embodiment, multiple rules can be specified for each component, but during back end processing a single rule is selected from the multiple rules. Processing determines which rule's trigger fires based on the incoming query.]] Each component's attributes (e.g., colSpan and rowSpan) are used to layout the selected location in the HTML file.

A determination is made as to whether default or custom rendering for the selected component should be used (decision 1015). If custom rendering has been specified, decision 1015 branches to "yes" branch 1020 whereupon, at step 1025, a user exit (i.e., custom routine) is called to render the element or to change the layout before standard rendering is performed. If custom rendering is not being used for the component, decision 1015 branches to "no" branch 1028 whereupon, at step 1030, the HTML is included in the HTML file to render the component in the selected layout location in a standard, or default, manner as indicated by the location and component attributes.

At step 1035, rule code for the component is executed. A rule generally has some basic attributes that are shared by all rules, such as a "title," which is a value that is explicitly shown to the end user. The title is similar to a header for a particular section. At step 1040, component type details are included for the particular type of component that is being processed. As will be seen in FIGS. 11-14, the components are added to the desired layout locations using the layout editor. Below are descriptions of the various components that can be added to a layout location and that are processed using the steps described on FIG. 10.

Bread crumb component (1045). The bread crumb component serves as a description of the user actions taken to get to this particular resultset. For each key/value pair in the breadcrumb data object render the key and value. The value can be one of many types (i.e. int, string, datetime, etc). For each of these types the value may be rendered in a different format. The displayFormats exist on all the elements in the Layout Module Configuration. These allow for each data type to be rendered differently. In addition to the selected value shown in the bread crumb, there is an option to showDrillSideways (these are the values for a particular feature if this particular constraint was dismissed and the rest were kept.) The last thing that is rendered is a dismiss link, which all allows the end user remove one particular constraint at a time (not necessarily the last constraint).

Page control component (1050). This container holds many element types including: "Group By"—what feature is used to group like values together in the result table; "Sort By"—what feature is used to order the rows in the result table; "Per Page"—the number of result shown on a given page; "Add Column"—allows for the end user to explicitly add columns into the result table; and "Pagination"—a control that allows the end user to navigate through multiple pages in a result set. The page control component determines how the area is going to be laid out. This is similar to the Location computation in that fillNum, fillDirection, colspan, and rowspan are used to determine how an area is laid out. The page control component creates a grid (tabular object) that places the elements held by this container, iterates through the grid and render each element in turn in the correct cell, and for each element it optionally renders a prefix.

Custom component (1055). This is a place holder in the model that allows a user to add their own jsp/java code if the model does not completely support what they want to accomplish. During a custom component, a call out is made to user code and the user code can perform whatever actions are needed for the customization. The current context and configuration are passed to the user code to give it a complete context while rendering the particular component.

Query box component (1060). This component is an input box tied to the current end user's state and the Backend server. This component inserts a text box where the user can enter a query, inserts the "submit" button on the user's display, and optionally inserts the option to search within the current end user's context or start a fresh query with the text provided in the text box.

HTML Result Set Component (1065). The simplest of elements returned from the search system. This component is a section of HTML code that is placed in a particular location. This component takes the HTML returned from the Backend and renders it.

Refine Group Component (1070). This is a container that holds multiple refinement (navigational) elements. A single Layout may contain multiple RefineGroupComponents placed in various locations. This component collects all refinement values that belong to this group and create a grid and determines how the values will be render. They can be rendered as single select links, single select dropdown, or multi-select checkboxes. This component iterates through the grid and renders each feature's tally data. Optionally, this component renders the Title. For each unique value for a particular feature, this component renders the value as a link or with a preceding checkbox with the appropriate back end command. Optionally, this component renders the counts for each value.

Sub-location component (1075). This is a recursive component that provides an added level of flexibility to the model in terms of the set of possible layouts. This component performs the same area computation with respect to fillNum, fillDirection, colspan, and rowspan as Location attributes (described above) did for a particular location.

Result Set Component (1080). This renders the table for the results returned from the back end. This component creates a grid for each ResultSet Object in the Layout. The process of creating a grid here takes into account values on a per result basis (ResultRow triggered off a particular result's values), group by, fillNum, fillDirection, and transpose. This component iterates through the grid and renders each result and group by entity. In order to render a result, a ResultRow is used as a template. A ResultRow can contain multiple HTML rows. The rows contain cells and the cells contain attributes. These entities exist at various points in the grid and are accounted for along the way. ResultSetCells have colspan and rowspan attributes that can be used in the same way as mentioned above to further refine the layout. The ResultSetAttributes are rendered in a cell using the attributes at the ResultSetCell level (i.e. cellType, fillDirection, fillNum, labelFormat, showLabel, and attributeSeparator).

Voice Over Component (1085). This is a restatement of the end user's query in natural language. (i.e. if the end user asked "phone green", it might come back and state "You asked: Phones in color green." It also instructs what action was taken; a query asked, a navigation element clicked, etc. This component determines what action was just executed by the end user. For each of the types, this component determines what data is provided and renders that data.

Figure 11:
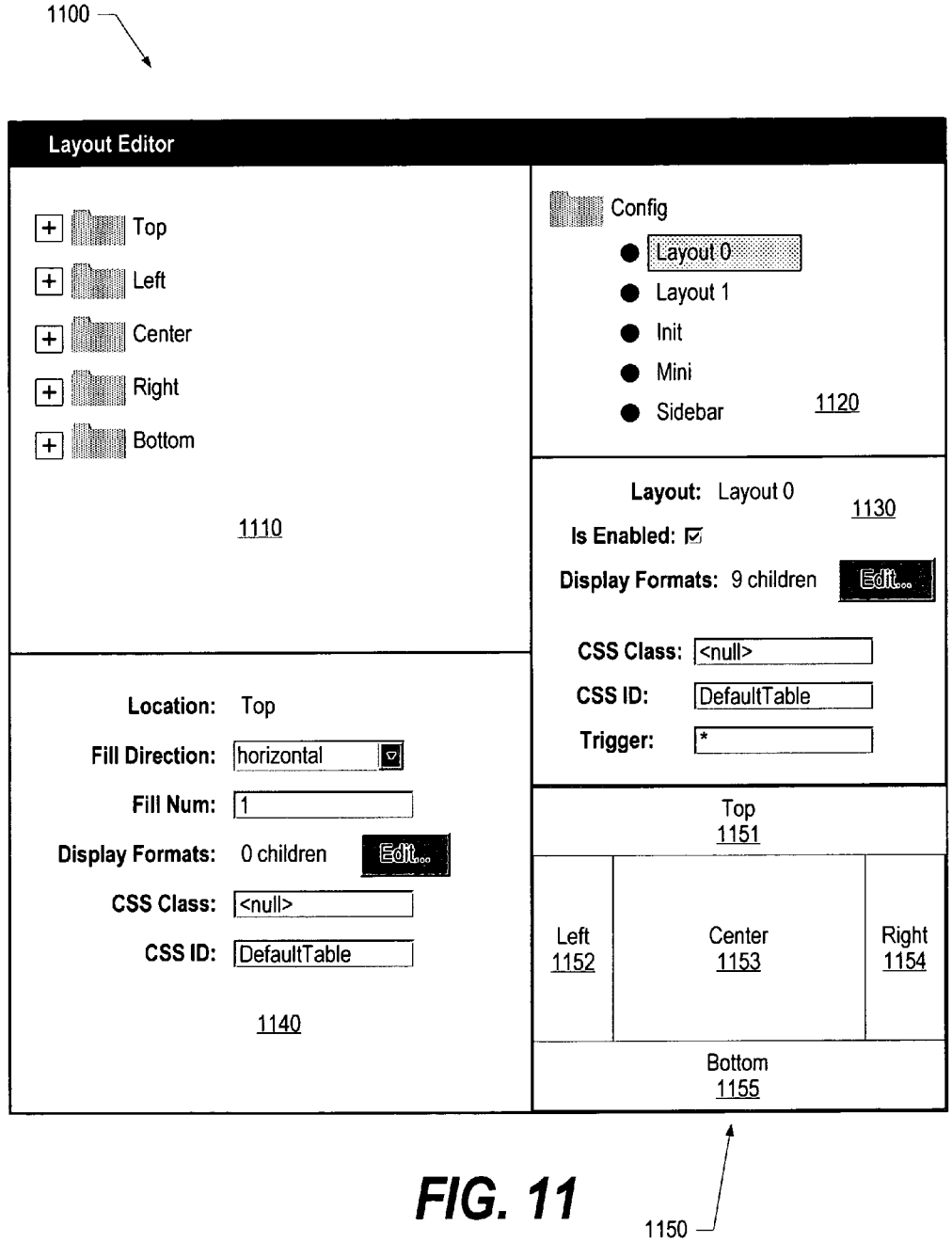
FIG. 11 is a screen diagram showing one aspect of a GUI-based editor used to create a layout configuration.

FIG. 11 is a screen diagram showing one aspect of a GUI-based editor used to create a layout configuration. Editor window 1100 is divided into a number of frames. Frame 1110 shows a folder icon for each location in the layout that is being configured (top location, left location, center location, right location, and bottom location). Frame 1120 is used to select a configuration. In the example shown, "Layout 0" configuration has been selected. Details regarding the selected layout (Layout 0) are shown in frame 1130. These details include a check box field indicating that this layout configuration is enabled. Frame 1130 also indicates a display format. In the example shown, the display format includes nine children with a command button that can be used to edit the display format (i.e., to choose a different number of children). The cascading style sheet class (CSS Class), and identifier (CSS ID) are also provided in text boxes that can be altered by the user. In addition, a "trigger" text box is provided. The user can enter trigger values into this text box to indicate what triggers are used to select this layout configuration.

Frame 1140 shows details corresponding to one of the locations in the layout configuration. In the example, details regarding the "top location" are being shown. The details provided in frame 1140 depend on the location that is being shown (i.e., some locations include attributes that other locations do not include for this layout configuration). In the example shown, the attributes for the top location include "fill direction" which has been selected as "horizontal" (the user can use the combo box to select "vertical" instead). The fill number (Fill Num) can also be entered by the user. In the example, the fill number is one. The display formats indicates the number of children that are displayed (in the example, zero children are displayed). Here "children" refers to the number of display formats that have been defined. The user is not setting the number of children. When the user clicks on that button a popup is displayed where the user can specify the render format for different features and different types. This attribute can be changed by using the corresponding "edit" command button. The cascading style sheet class (CSS Class), and identifier (CSS ID) are also provided for this location in text boxes that can be altered by the user. The CSS Class and CSS ID for a given location can be different from the CSS Class and ID for the layout, which is displayed in frame 1130. The CSS class and CSS ID are usually different for each location in the configuration tree. The purpose for setting this is to tie this particular component to a particular CSS configuration to change the way a particular entity appears when rendered by the browser.

Frame 1150 shows a diagram of the various locations that make up the layout configuration. The layout configuration includes top location 1151, left location 1152, center location 1153, right location 1154, and bottom location 1155. In one embodiment, the user can change the relative position and size of the various locations by selecting one of the lines separating the locations (i.e., using a mouse) and dragging the line in a given direction. For example, the user can make the center location smaller so that more information can be displayed in the left location.

Figure 12:
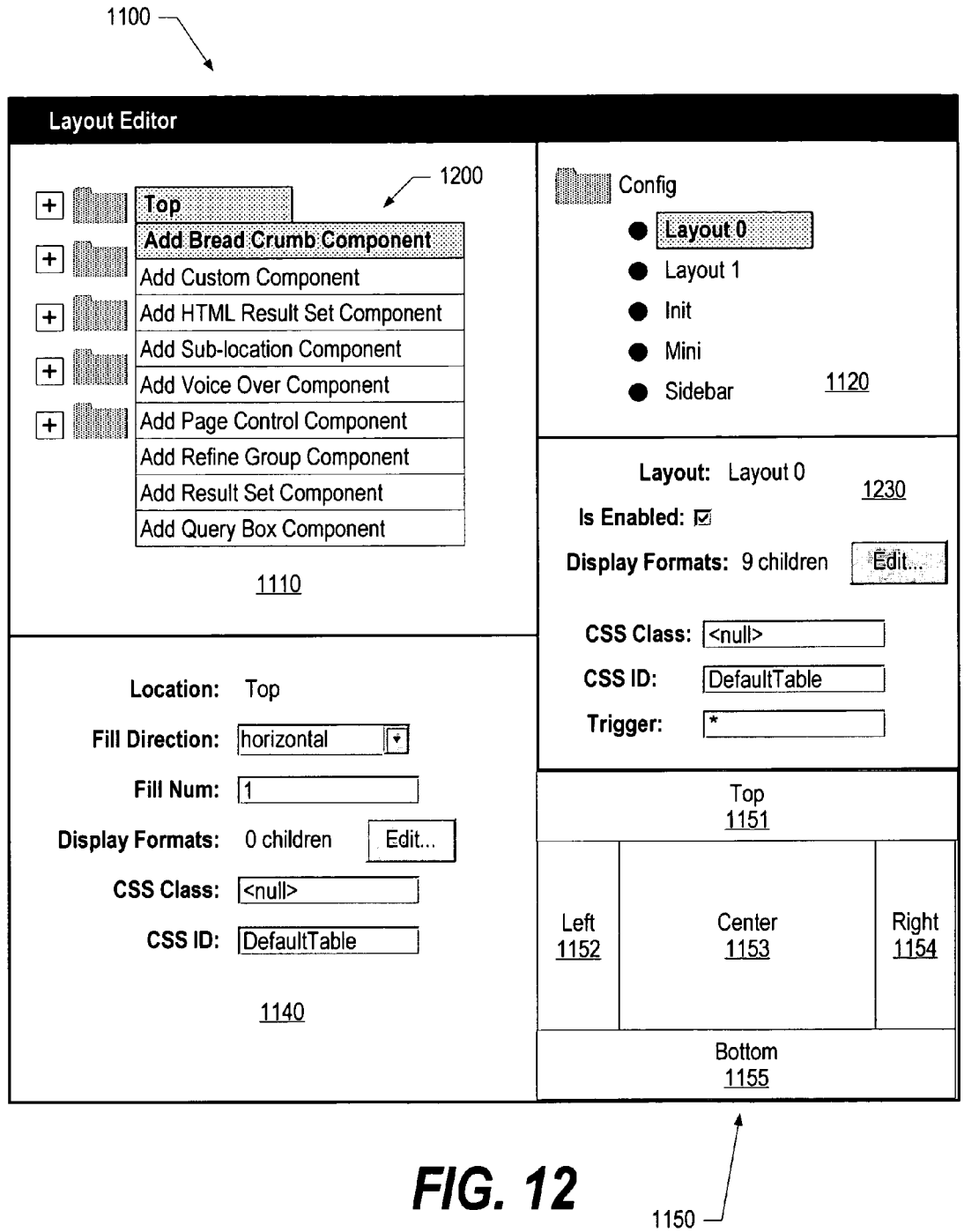
FIG. 12 is a screen diagram showing a second aspect of the GUI-based editor used to create a layout configuration.

FIG. 12 is a screen diagram showing a second aspect of the GUI-based editor used to create a layout configuration. FIG. 12 shows display 1100 with the user selecting one of the locations (the top location) resulting in the appearance of menu control. The user can select one of the various components listed in the menu control. Descriptions of the various components are shown and described in FIG. 10 and corresponding text.

Figure 13:
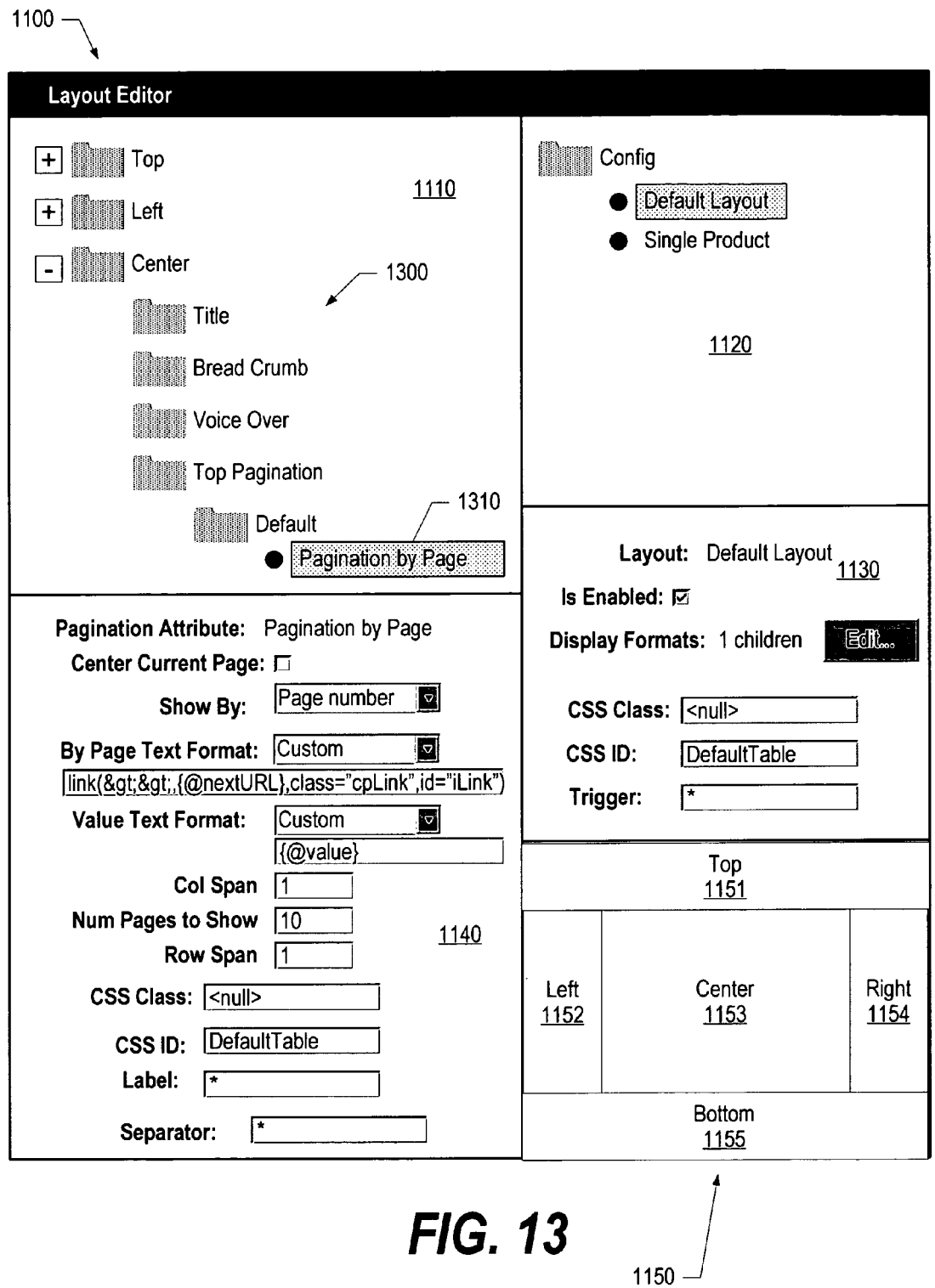
FIG. 13 is a screen diagram showing a third aspect of the GUI-based editor used to create a layout configuration.

FIG. 13 is a screen diagram showing a third aspect of the GUI-based editor used to create a layout configuration. FIG. 13 shows the user drilling down to detailed attributes regarding the layout configuration. In FIG. 13, the user has selected the "center location" in frame 1110 which results in various attributes of the center location to appear (folders 1300). In the example, the "top pagination" attribute has been selected and within this attribute, the user has selected "pagination by page" attribute 1310. Frame 1140 now shows the details of the pagination by page attribute. These attributes include whether the current page should be centered in the pagination string. Other attributes include how the page number should be shown, the page text format (with a custom entry text box for entering custom page text formats), a value text format (with a custom entry box for entering custom value text formats), a column span (col span) attribute for entering the number of columns the page attribute display should span, the number of pages that should be shown in the pagination string, a row span attribute for entering the number of rows the page attribute display should span, a cascading style sheet class and identifier (CSS Class and CSS ID) for entering cascading style sheet information that should be used (note that this style sheet information can be different than the style sheet information for the layout configuration which is shown in frame 1130). In addition, a label and a separator can be provided. Labels are the prefix for page control. For example, the user may want to have it prefixed by "Pages:". The separator is the value used to separate the page links. For example, the user typically uses a comma (",") or vertical bar ("|") character.

Figure 14:
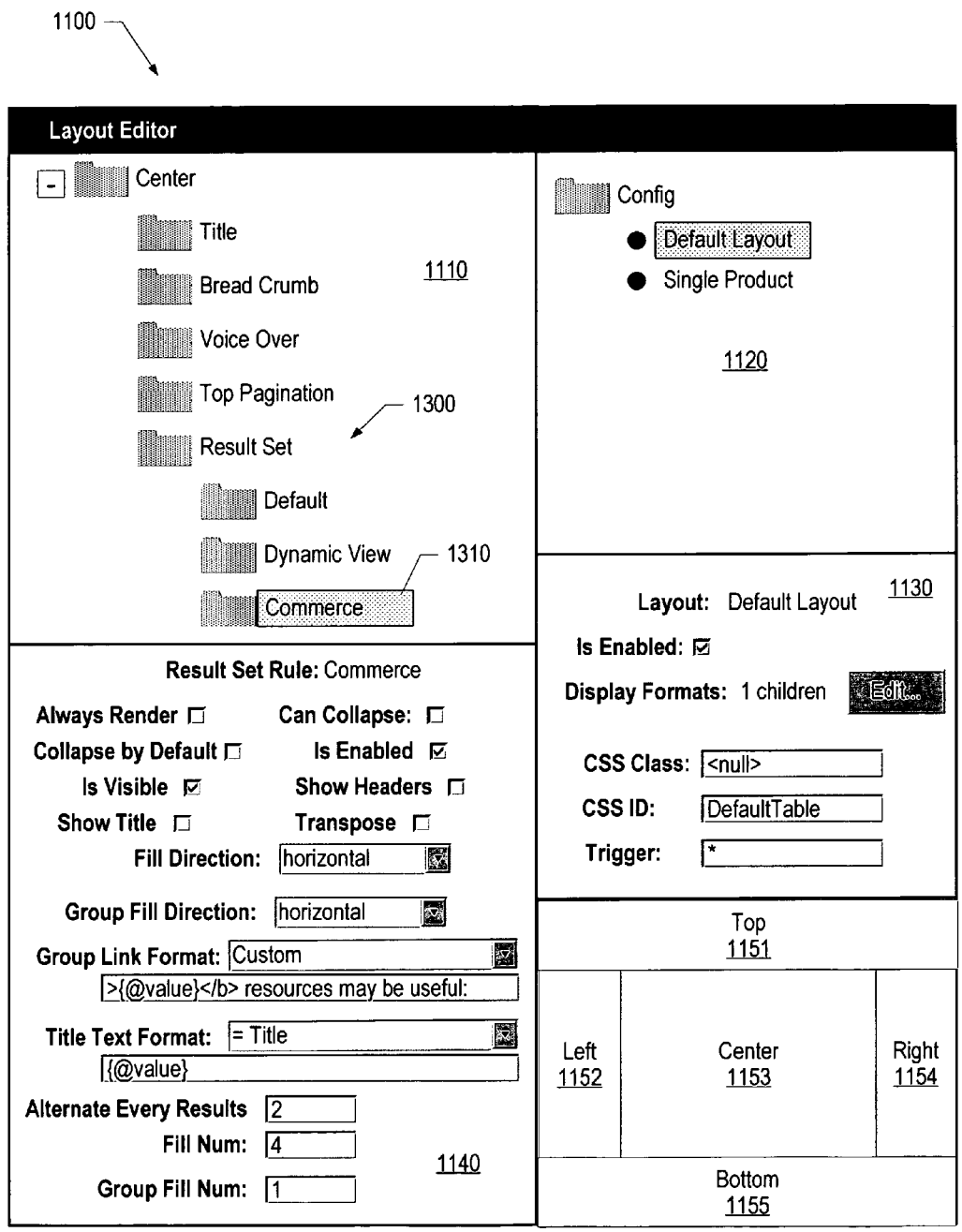
FIG. 14 is a screen diagram showing a fourth aspect of the GUI-based editor used to create a layout configuration.

FIG. 14 is a screen diagram showing a fourth aspect of the GUI-based editor used to create a layout configuration. In this example, the user has selected the "result set" component (1300) that corresponds with the center location of the layout configuration. Within the result set component, the user has selected a particular rule set to apply to the result set. In this case, the user has selected the "commerce" result set rule (1310). Detailed attributes regarding the "commerce" result set rule are shown in frame 1140. These attributes include whether the result set is always rendered, whether it can be collapsed, whether it is collapsed by default, whether it is enabled, whether it is visible, whether headers should be shown, whether a title should be displayed, and whether data should be transposed. If transposed, the item is rotated counter-clockwise 90 degrees. For example, if the user defines the layout to have to column headers on the top, transposing will move the headers to run down the left hand side. This is often used to create a product comparison look and feel. In addition, the user can specify how data (children) are filled into the center location using the commerce rule set (fill direction and group fill direction), and a group link format (with a custom text box for entering custom group link information). A result set table can be shown by a group value. This may be used to show results grouped by catalog or brand (as an example). Within each group the results do not have to be rendered one per row. The groupfilldirection and groupfillnum parameters can be used to layout the results in a group just as a layout location is laid out. A group link is a link associated link a group of results that when clicked adds that as a constraint so that the user is only seeing results from that particular group. A title text format combo box is provided along with a text box for entering customized data. Text boxes are also provided for alternating the results, the fill number, and the group fill number. The "alternate every" renders the result table rendering so that the background color alternates (toggles) every other row.

Figure 15:
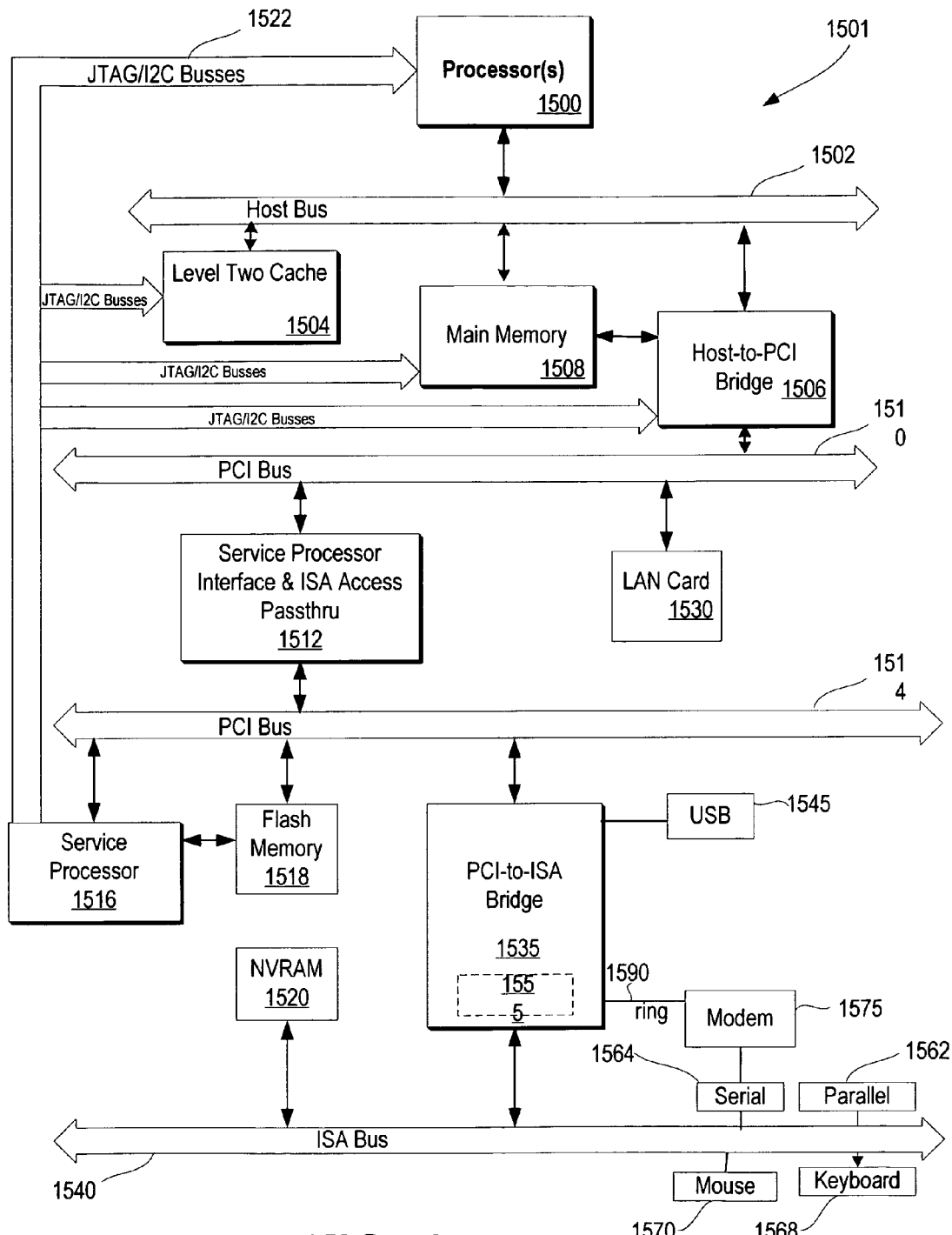
FIG. 15 is a block diagram of a broadband engine that includes a plurality of heterogeneous processors in which the present invention can be implemented.

FIG. 15 illustrates information handling system 1501 which is a simplified example of a computer system capable of performing the computing operations described herein. Computer system 1501 includes processor 1500 which is coupled to host bus 1502. A level two (L2) cache memory 1504 is also coupled to host bus 1502. Host-to-PCI bridge 1506 is coupled to main memory 1508, includes cache memory and main memory control functions, and provides bus control to handle transfers among PCI bus 1510, processor 1500, L2 cache 1504, main memory 1508, and host bus 1502. Main memory 1508 is coupled to Host-to-PCI bridge 1506 as well as host bus 1502. Devices used solely by host processor(s) 1500, such as LAN card 1530, are coupled to PCI bus 1510. Service Processor Interface and ISA Access Pass-through 1512 provides an interface between PCI bus 1510 and PCI bus 1514. In this manner, PCI bus 1514 is insulated from PCI bus 1510. Devices, such as flash memory 1518, are coupled to PCI bus 1514. In one implementation, flash memory 1518 includes BIOS code that incorporates the necessary processor executable code for a variety of low-level system functions and system boot functions.

PCI bus 1514 provides an interface for a variety of devices that are shared by host processor(s) 1500 and Service Processor 1516 including, for example, flash memory 1518. PCI-to-ISA bridge 1535 provides bus control to handle transfers between PCI bus 1514 and ISA bus 1540, universal serial bus (USB) functionality 1545, power management functionality 1555, and can include other functional elements not shown, such as a real-time clock (RTC), DMA control, interrupt support, and system management bus support. Nonvolatile RAM 1520 is attached to ISA Bus 1540. Service Processor 1516 includes JTAG and I2C busses 1522 for communication with processor(s) 1500 during initialization steps. JTAG/I2C busses 1522 are also coupled to L2 cache 1504, Host-to-PCI bridge 1506, and main memory 1508 providing a communications path between the processor, the Service Processor, the L2 cache, the Host-to-PCI bridge, and the main memory. Service Processor 1516 also has access to system power resources for powering down information handling device 1501.

Peripheral devices and input/output (I/O) devices can be attached to various interfaces (e.g., parallel interface 1562, serial interface 1564, keyboard interface 1568, and mouse interface 1570 coupled to ISA bus 1540. Alternatively, many I/O devices can be accommodated by a super I/O controller (not shown) attached to ISA bus 1540.

In order to attach computer system 1501 to another computer system to copy files over a network, LAN card 1530 is coupled to PCI bus 1510. Similarly, to connect computer system 1501 to an ISP to connect to the Internet using a telephone line connection, modem 1575 is connected to serial port 1564 and PCI-to-ISA Bridge 1535.

While the computer system described in FIG. 15 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving a query request from a requestor over a computer network;
retrieving user data corresponding to the requestor;
augmenting the received query request with the retrieved user data;
comparing the augmented query request to a plurality of triggers associated with a plurality of layout configurations;
selecting one of the layout configurations based on the comparison, wherein the selected layout configuration is based in part on the retrieved user data in the augmented query request;
identifying one or more components included in the selected layout configuration;
answering the augmented query request utilizing a search engine, the answering resulting in a query answer that includes one or more query results;
in response to selecting one of the layout configurations and further in response to answering the augmented query request, creating a markup language response that includes a markup language version of each of the identified components, wherein the markup language version for at least one of the identified components is based upon the query answer, and wherein creating the markup language response further comprises:
identifying a plurality of layout locations within the selected layout configuration, wherein each of the layout locations includes one or more of the identified components;
identifying rules corresponding to each of the identified components;
retrieving layout features used to satisfy the identified rules; and
updating a result object that includes the selected layout configuration and the retrieved layout features, wherein the markup language response is created from the result object; and
in response to creating the markup language response, sending the markup language response to the requestor over the computer network, wherein the markup language response includes the query results and the selected layout configuration.

2. The method of claim 1 wherein the markup language response is in a Hypertext Markup Language format.

3. The method of claim 1 further comprising:
receiving site context data in the received query request; and
augmenting the received query request with the received site context data prior to comparison of the augmented query request to the plurality of triggers, wherein the selected layout configuration is based in part on the received site context data in the augmented query request.

4. The method of claim 1 further comprising:
determining that one or more security constraints are included in the user data; and
augmenting the received query request with the security constraints prior to comparison of the augmented query request to the plurality of triggers, wherein the answering the augmented query request is based in part on the security constraints in the augmented query request.

5. An information handling system comprising:
at least one processor;
at least one memory associated with the at least one processor;
a network interface connecting the information handling system to a computer network;
a nonvolatile storage area associated with the at least one processor; and
a set of instructions contained within the at least one memory, wherein the at least one processor executes the set of instructions in order to perform actions of:
receiving a query request from a requestor over the computer network;
retrieving user data corresponding to the requestor;
augmenting the received query request with the retrieved user data;
comparing the augmented query request to a plurality of triggers associated with a plurality of layout configurations;
selecting one of the layout configurations based on the comparison, wherein the selected layout configuration is based in part on the retrieved user data in the augmented query request;
identifying one or more components included in the selected layout configuration;
answering the augmented query request utilizing a search engine, the answering resulting in a query answer that includes one or more query results;
in response to selecting one of the layout configurations and further in response to answering the augmented query request, creating a markup language response that includes a markup language version of each of the identified components, wherein the markup language version for at least one of the identified components is based upon the query answer, and wherein creating the markup language response further comprises:
identifying a plurality of layout locations within the selected layout configuration, wherein each of the layout locations includes one or more of the identified components;
identifying rules corresponding to each of the identified components;
retrieving layout features used to satisfy the identified rules; and
updating a result object that includes the selected layout configuration and the retrieved layout features, wherein the markup language response is created from the result object; and
in response to creating the markup language response, sending the markup language response to the requestor over the computer network, wherein the markup language response includes the query results and the selected layout configuration.

6. The information handling system of claim 5 wherein the markup language response is in a Hypertext Markup Language format.

7. The information handling system of claim 5 wherein the actions further comprise:

receiving site context data in the received query request; and augmenting the received query request with the received site context data prior to comparison of the augmented query request to the plurality of triggers, wherein the selected layout configuration is based in part on the received site context data in the augmented query request.

8. The information handling system of claim 5 wherein the actions further comprise:

determining that one or more security constraints are included in the user data; and augmenting the received query request with the security constraints prior to comparison of the augmented query request to the plurality of triggers, wherein the answering the augmented query request is based in part on the security constraints in the augmented query request.

9. A computer program product embedded in a computer readable storage medium, comprising computer instructions that, when executed by the data processing system, causes the data processing system to perform actions comprising:

receiving a query request from a requestor over a computer network;

retrieving user data corresponding to the requestor;

augmenting the received query request with the retrieved user data;

comparing the augmented query request to a plurality of triggers associated with a plurality of layout configurations;

selecting one of the layout configurations based on the comparison, wherein the selected layout configuration is based in part on the retrieved user data in the augmented query request;

identifying one or more components included in the selected layout configuration;

answering the augmented query request utilizing a search engine, the answering resulting in a query answer that includes one or more query results;

in response to selecting one of the layout configurations and further in response to answering the augmented query request, creating a markup language response that includes a markup language version of each of the identified components, wherein the markup language version for at least one of the identified components is based upon the query answer, and wherein creating the markup language response further comprises:

identifying a plurality of layout locations within the selected layout configuration, wherein each of the layout locations includes one or more of the identified components;

identifying rules corresponding to each of the identified components; retrieving layout features used to satisfy the identified rules; and updating a result object that includes the selected layout configuration and the retrieved layout features, wherein the markup language response is created from the result object; and in response to creating the markup language response, sending the markup language response to the requestor over the computer network, wherein the markup language response includes the query results and the selected layout configuration.

10. The computer program product of claim 9 wherein the markup language response is in a Hypertext Markup Language format.

11. The computer program product of claim 9 wherein the actions further comprise:

receiving site context data in the received query request; and augmenting the received query request with the received site context data prior to comparison of the augmented query request to the plurality of triggers, wherein the selected layout configuration is based in part on the received site context data in the augmented query request.

12. The computer program product of claim 9 wherein the actions further comprise:

determining that one or more security constraints are included in the user data; and augmenting the received query request with the security constraints prior to comparison of the augmented query request to the plurality of triggers, wherein the answering the augmented query request is based in part on the security constraints in the augmented query request.

* * * * *